United States Patent [19]

Ballard

[11] Patent Number: 5,076,448

[45] Date of Patent: Dec. 31, 1991

[54] PORTABLE HYDRAULIC CRANE

[75] Inventor: James G. Ballard, Waukesha, Wis.

[73] Assignee: Hein-Werner Corporation, Waukesha, Wis.

[21] Appl. No.: 573,263

[22] Filed: Aug. 24, 1990

Related U.S. Application Data

[63] Continuation of Ser. No. 281,490, Dec. 8, 1988, abandoned.

[51] Int. Cl.$^5$ .......... B60P 1/48

[52] U.S. Cl. .......... 212/140; 212/182; 212/261; 212/265; 254/8 B

[58] Field of Search .......... 212/140, 182, 244, 254, 212/261, 263, 265, 187, 267, 175, 179, 180; 254/4 R, 4 B, 8 R, 8 B

[56] References Cited

U.S. PATENT DOCUMENTS

| | | | |
|---|---|---|---|
| 2,577,338 | 12/1951 | Leach | 212/180 |
| 2,804,979 | 9/1957 | Lassiter | 212/265 |
| 2,939,590 | 6/1960 | Henry . | |
| 3,059,785 | 10/1962 | Buckeye | 212/264 |
| 3,145,857 | 8/1964 | Hayman et al. | 212/261 |
| 3,367,512 | 2/1968 | Kaplan | 212/182 |
| 3,521,860 | 7/1970 | Zehrung, Jr. | 254/8 |
| 3,749,254 | 7/1973 | Grider | 212/267 |
| 3,788,492 | 1/1974 | Kraft | 212/267 |
| 3,825,132 | 7/1974 | Colangelo . | |
| 4,190,233 | 2/1980 | Godfrey . | |
| 4,508,233 | 4/1985 | Helms | 212/264 |
| 4,663,900 | 5/1987 | Rehm et al. | 212/267 |
| 4,669,703 | 6/1987 | Hawkins et al. . | |
| 4,749,324 | 6/1988 | Rulison | 212/261 |
| 4,770,304 | 9/1988 | Woods | 212/189 |

FOREIGN PATENT DOCUMENTS

| | | | |
|---|---|---|---|
| 2003769 | 11/1970 | Fed. Rep. of Germany . | |
| 59878 | 8/1954 | France . | |
| 62520 | 9/1948 | Netherlands | 212/244 |

*Primary Examiner*—Joseph F. Peters, Jr.
*Assistant Examiner*—Thomas J. Brahan
*Attorney, Agent, or Firm*—Michael, Best & Friedrich

[57] ABSTRACT

The crane having a generally trapezoidal frame with a caster wheel at each corner. A mast is mounted on the front of the frame with a brace between each rear corner and top of the mast. Spring loaded pins are used for these connections. A lifting ram is pivotally connected to the mast and to a telescopic boom pivoted on the mast. The frame has a socket on each side and a telescopic leg including inner and outer tubes is mounted in each socket. A spring loaded pin fixes the tubes relative to each other. The end of each leg has a wheel. Each leg can pivot relative to its sleeve to enable raising the leg to position the distal end near the mast. The legs can be disconnected from the sleeves and a locking device prevents removal of the legs.

18 Claims, 3 Drawing Sheets

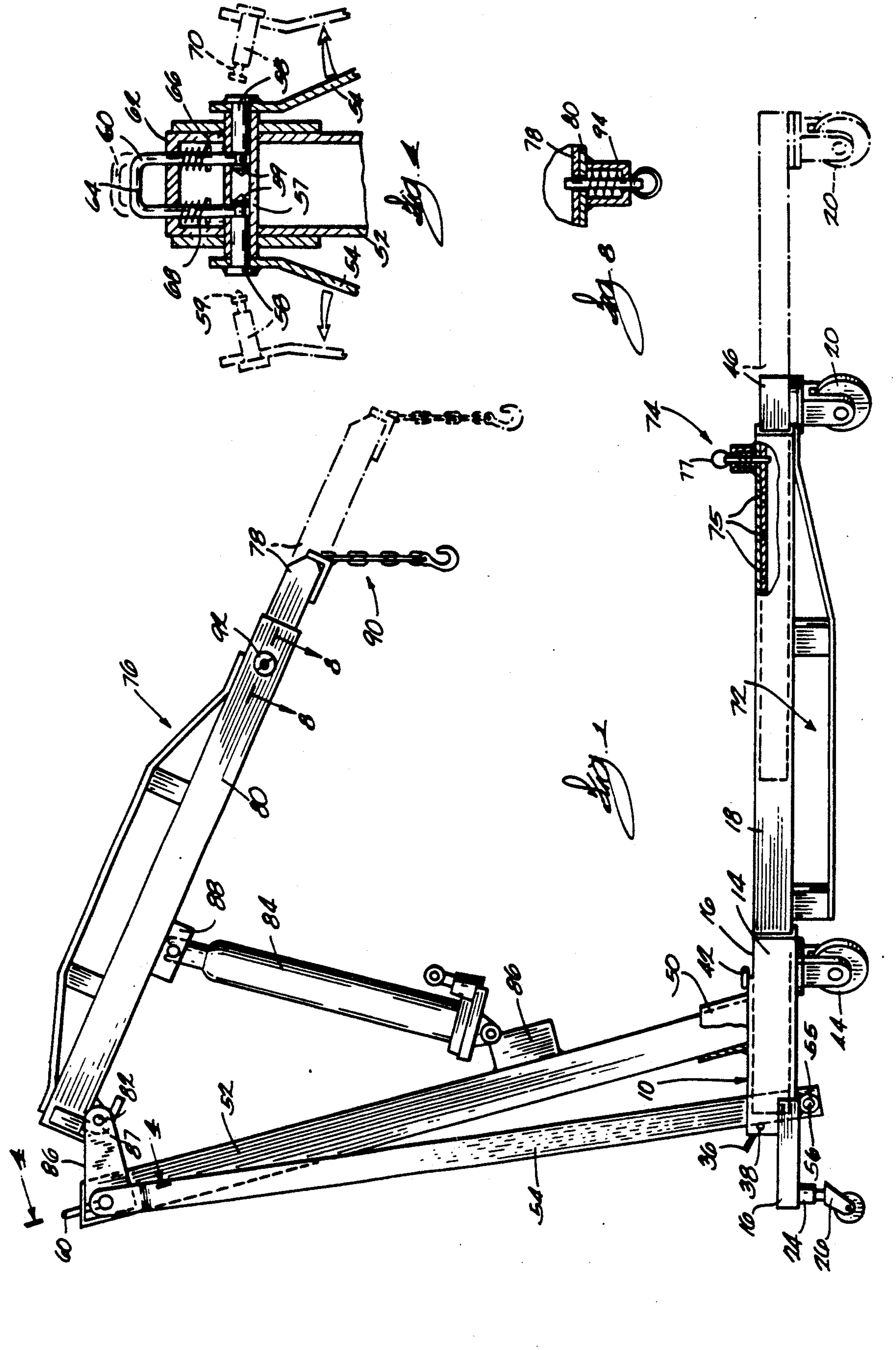

PORTABLE HYDRAULIC CRANE

This is a continuation of U.S. patent application Ser. No. 281,490, filed Dec. 8, 1988 now abandoned.

FIELD OF THE INVENTION

The invention relates to portable hydraulic cranes of the type used in automotive maintenance and repair and in other similar applications.

BACKGROUND OF THE INVENTION

Portable hydraulically operated cranes are commonly used in automotive repair shops and service stations, as well as by individuals in home auto repair and are provided by rental agencies for home automotive repair.

When a portable crane is not in use, it must be stored. Some prior art cranes are designed such that they can be taken apart to be stored in more compact space. Other cranes are designed such that various portions of the cranes can be folded for storage. An example of a prior art crane including some components which can be disassembled for storage is illustrated in the Zehrung et al. U.S. Pat. No. 3,521,860, issued July 28, 1970. That crane has the disadvantage of requiring a separate cart for storage or movement of the crane when it is disassembled.

SUMMARY OF THE INVENTION

This invention provides an improved portable crane with legs which can be either readily removed, or alternatively, pivoted to a folded storage position. The crane also includes a means for supporting the crane boom such that it can be either readily removed, or alternatively, folded to a storage position. The crane embodying the invention is also provided with wheels which facilitate movement of the crane and can serve as dolly wheels when the folded crane is tilted back for movement. No special tools are needed for disassembly of the crane nor folding of the crane to a folded storage position, and the locks, pins and the like which hold the crane parts in assembled position are built in or otherwise retained to reduce the likelihood of the user substituting inferior or weaker parts.

More specifically, this invention provides a crane having a generally trapezoidal base or frame on which a mast is mounted. A boom is supported by the upper end of the mast. Each of the diverging sides of the base or frame includes a tube or socket which houses an end of a tubular leg assembly in telescoping relation. A lock member or latch is mounted in the socket and selectively interferes with removal of the tubular leg from the socket by engaging a bracket fixed inside the tubular leg. The latch can be selectively moved to a non-interfering position by manually depressing an actuator tab to permit removal of the telescoping leg from the socket.

Another feature of the crane embodying the invention is that the bracket in the tubular leg includes a hooked end which can engage the latch mounted in the socket and serve as a pivot supporting the leg such that it can swing upwardly more than 90° to a storage position.

Another feature of the crane embodying the invention is that the mast, boom power unit and side braces can be easily removed without tools. The mast is a tube which fits in a socket on the base, and side braces are connected to the mast and frame by simple pins which can't be lost.

The crane can be folded into the storage mode by folding the legs and boom to positions generally parallel to the mast. The trapezoidal frame has a wheel at each corner, and the folded crane can be easily moved with the rear wheels functioning as a dolly.

BRIEF DESCRIPTION OF THE DRAWINGS

FIG. 1 is a side elevation of a crane embodying the invention.

FIG. 4 is a section view taken through the top portion of the mast as illustrated by line 4—4 on FIG. 1.

FIG. 8 is a cross section view taken along line 8—8 in FIG. 1.

DETAILED DESCRIPTION OF THE DRAWINGS

Figure 3:
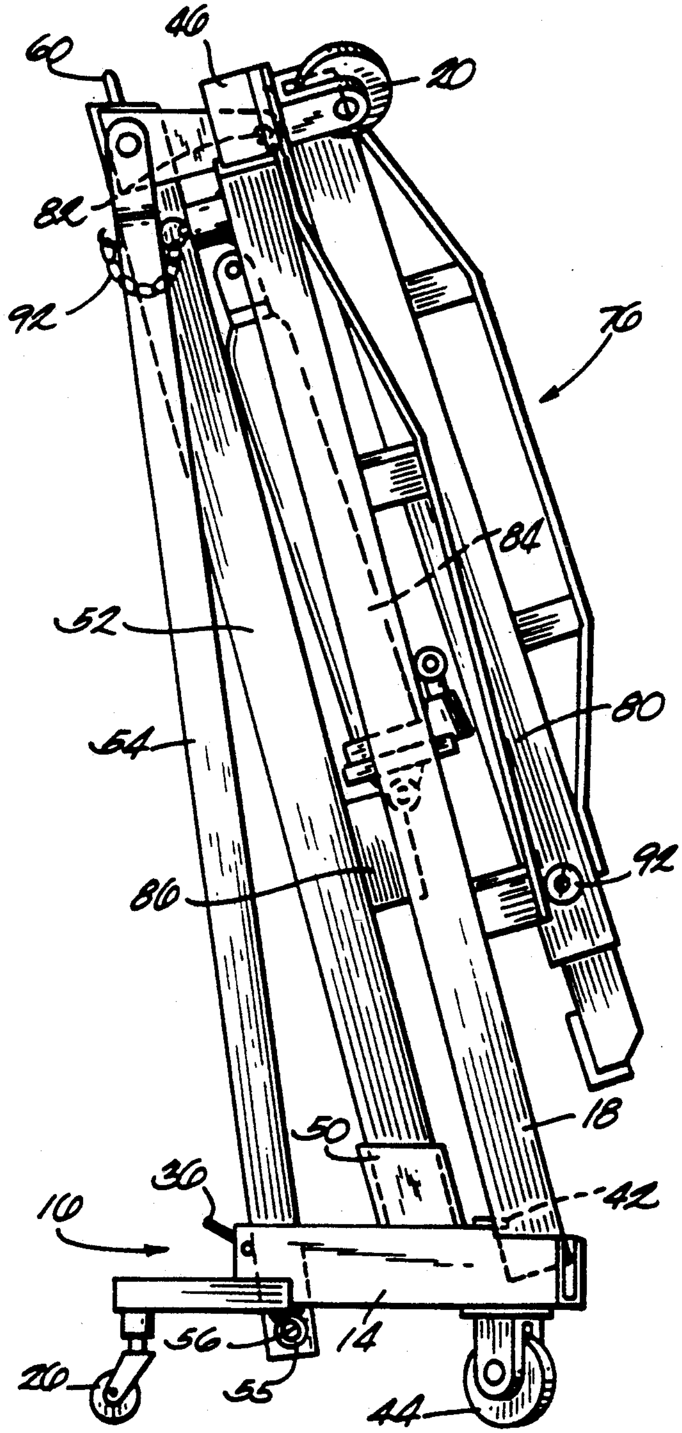
FIG. 3 is a side elevation of the crane shown in FIGS. 1 and 2 and with the legs folded up and the boom folded down for storage.
Figure 2:
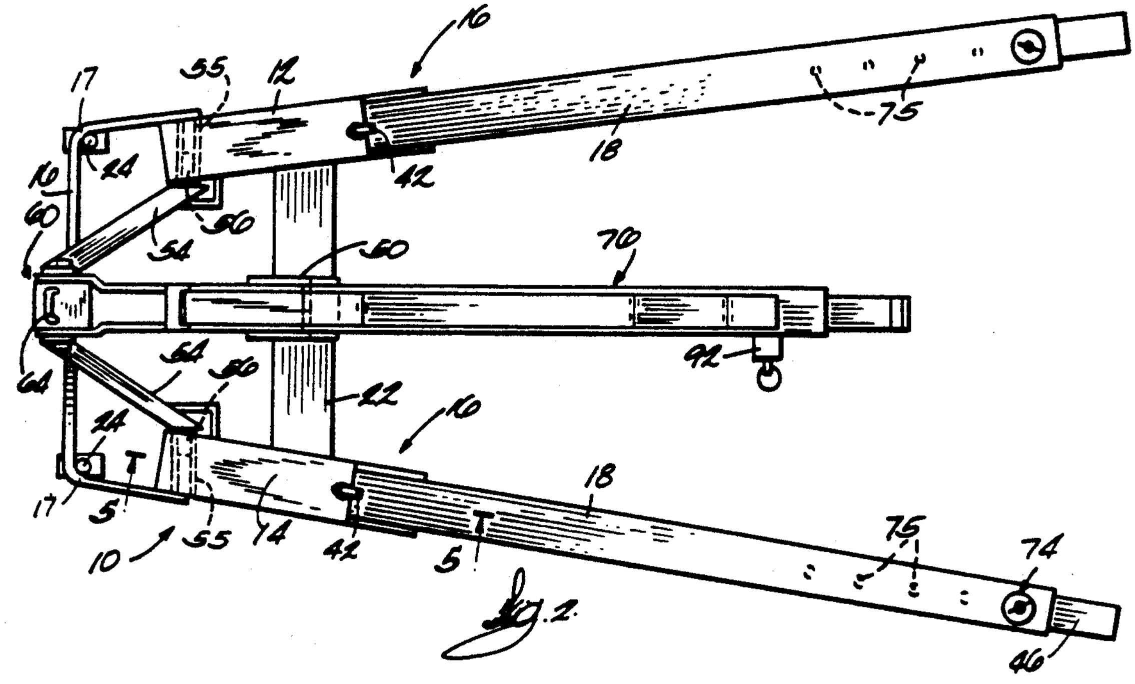
FIG. 2 is a top plan view of the crane shown in FIG. 1.

The portable hydraulic crane embodying the invention includes a generally trapezoidal frame or base 10 including two diverging tubes or sockets 12, 14 each being generally square in cross section and being joined by a U-shaped bracket 16. The U-shaped bracket 16 has opposite ends welded to the rearward ends of the tubes 12 and 14. The tubes 12 and 14 also each include a forward portion, and the top of each forward portion is cut away so as to provide an upwardly opening channel. An end portion of a square tubular leg 18 is housed in telescoping relation in each socket 12, 14. Square tubular leg extensions 46 are telescopingly housed in the ends of each leg 18 and provide for adjustment of the leg length. A caster wheel 20 is fixed to the outer or distal end of the inner telescoping leg 46 to support the outer end of the leg 46 and to facilitate movement of the crane.

A square tubular cross member 22 interconnects the two sockets 12 and 14, and each of the two rear corners formed by bends 17 in bracket 16 carry a downwardly extending support pin 24 to which the rear caster wheels 26 are connected.

Figure 5:
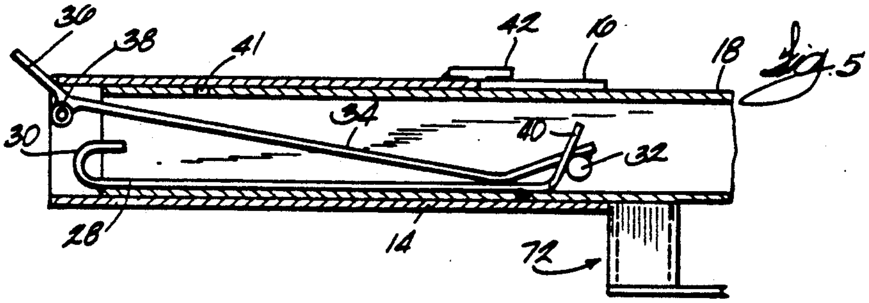
FIG. 5 is an enlarged detail section taken on line 5—5 in FIG. 2.
Figure 7:
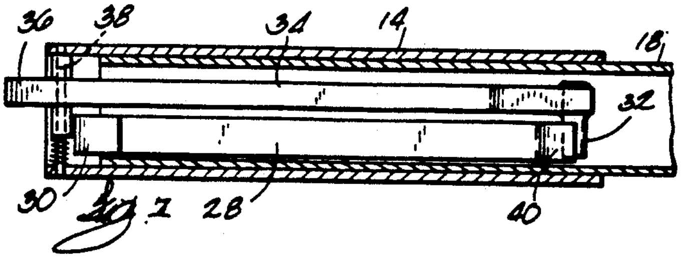
FIG. 7 is a cross section plan view of the apparatus shown in FIG. 6.
Figure 6:
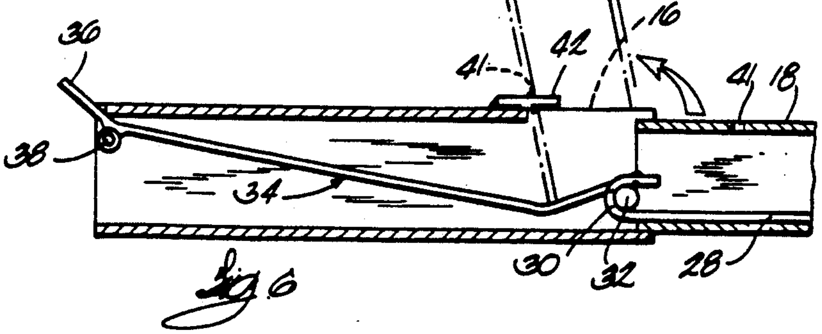
FIG. 6 is an enlarged detail showing the manner in which the legs can be pivoted upwardly.

As best shown in FIGS. 5 and 6, when the telescoping leg 18 is housed in a socket 12 or 14, a bracket 28 fixed inside the lower portion of the end of the leg 18 cooperates with a latch 34 housed in the socket and functions to releaseably prevent removal of the leg 18 from the socket unless the latch 34 is moved to a position permitting release of the leg 18. The latch member 34 has an end 36 which can be manually depressed to pivot latch 34 in the counter clockwise direction as shown in FIG. 5 about pivot 38 to raise a keeper pin 32 fixed to the opposite end of the lever 34, and such that a hooked end 30 of bracket 28 can pass under keeper pin 32 when telescoping leg 18 is pulled out of the socket. When the leg 18 has been pushed into the socket 12 or 14, and when the latch member is in the position shown in FIG. 5, an upwardly extending end 40 of bracket 28 will be engaged by the keeper pin 32 and limit movement of the leg out of the socket. The leg 18 can be removed from the socket by depressing tab 36 to raise keeper pin 32 to a position in which it does not interfere with the hook 30. Then the end of the leg 18 can be withdrawn from the socket. If tab 36 is released after the turned-up end 40 moves beneath the keeper pin 32, the hook 30 will engage the keeper pin 32 as shown in FIG. 6 and prevent removal of the leg 18 from the socket.

When the leg 18 is moved out of the socket to the position shown in FIG. 6 wherein the hook 30 engages the keeper pin 32, the leg 18 can then be pivoted up and back to the position shown in the phantom. The top portion of the outward end of each socket 12 and 14 is cut away to permit such pivotal movement of leg 18, and in this position each leg 18 is in an upstanding position between the spaced side walls of the outer end of the sleeve. As the leg 18 moves to this position, a hole 41 in the top surface of the inner end of each leg 18 will house a pin 42 welded to the top of the socket 12 or 14, and the pin 42 will restrain the leg 18 against lateral movement and keep it in position adjacent the mast.

The tubular cross member 22 has an upper surface supporting an upwardly extending socket 50 secured thereto and adapted to house the lower end of a mast 52. The mast 52 extends generally vertically upwardly from socket 50 but at a rearward angle such that the upper end of the mast is approximately over the rear of the trapezoidal base. The mast 52 is supported against lateral movement by braces or straps 54 having lower ends secured to rearward ends of the sockets 12 and 14 and upper ends engaging the upper end of the mast 52. A pin 56 projects from the lower end of each brace 54 and is adapted to be received in a tube 55 welded to the bottom of a rearward portion of each socket 12 and 14. The upper end of the mast 52 includes a cross tube 57 (FIG. 4) having open opposite ends adapted to receive lock pins 58 welded on the upper ends of the braces 54. Each lock pin 58 can be pushed into the cross tube 57 such that conical end 59 of the lock pin will engage and push aside the end of a spring loaded release pin 60. The release pin 60 extends through the plate 62 at the top of the mast 52. The release pin 60 comprises an inverted, U-shaped bar having a bite portion 64 and legs slideably housed in bores provided in an end plate 62 of the mast, and the ends of the leg portions of pin 60 projecting through holes in the tube 57. The lower portion of each leg of the "U" includes a cross pin 66, and a spring 68 is compressed between the cross pin and the end plate 62.

The conical ends 59 of the brace pins 58 push the release pin 60 upwardly until the ends of the legs of the release pin 60 can drop into the grooves 70 in the shanks of each pin 58 to lock the brace 54 in place.

As indicated above, the legs can be extended, that is, the telescoping leg 46 telescopes inside the leg 18 (which is received in socket 14). The leg 18 has a stiffening truss 72 fixed on the bottom of the leg. The top of the leg 18 is provided with a pin 74 which is spring loaded downwardly into engagement with one of the holes 75 in the top surface of the inner leg 46 to provide convenient indexed locations for pinning the inner leg.

The crane embodying the invention further includes a boom 76 comprising an inner square tube 78 and an outer square tube 80. One end of the boom assembly is pivotably connected to the upper end of the mast 52 by a pivot pin 82. The upper end of the mast supports a pair of forwardly projecting spaced apart brackets 85, the forward ends of the brackets 85 supporting a pin 82. A hook 87 is fixed to the bottom portion of the end of the boom and engages the pin 82. The boom 76 is further supported by a hydraulic ram 84 pivotally connected at its lower end by a support 86 to the mast 52 and having an upper end releaseably supporting a bracket 88 of the boom. The ram 84 can be extended to elevate the free end of the boom 76 and to lift a load connected to the boom via the chain and the hook 90. The inner tube portion 78 of the telescoping boom is housed in the boom portion 80 and is extendable in the same manner as the legs 46 are extendible. A spring loaded lock pin assembly 92 on the end of boom portion 80 provides means for locking the inner telescoping boom portion 78 in a selected telescoping position.

As illustrated in FIG. 3, the crane can be folded for temporary storage with the boom 76 lowered into a position substantially parallel with the mast, and with the legs folded upwardly to positions on opposite sides of the mast 52 and generally parallel to the mast. When the crane is folded, the upper end of the ram 84 is disconnected from the boom 76 and is positioned against the mast 52. Then the boom 76 is lowered over the ram 84 such that it is parallel to the mast 52. The next step is to pivot the legs 18 up to their upwardly extending inactive position. To do this, the tab 36 of latch 34 is depressed to raise the keeper pin 32 to a position out of the way and to permit the leg assembly 18 to be pulled outwardly with respect to the socket 12 or 14 a little, at which time the tab 36 is then released and the keeper pin 32 goes back in place to be engaged by the hook 30 as the leg 18 is pulled out farther. The leg 18 is then free to pivot upwardly (using the keeper pin 32 as a pivot) to the upwardly extending slightly rearwardly tilted position. Due to the non-parallel nature of the sides of the trapezoidal frame, the folded legs converge towards the center so as to lie on either side of the mast. At this point, chains 92 (FIG. 3) having hooks or clips at their ends can be hooked to the rings 77 of pins 74 to keep the legs 18 from falling forward accidentally.

At this point, the crane is a very compact structure and it can be stored in that manner or it can be wheeled around very easily on the four caster wheels. The crane can also tilt rearwardly onto the small wheels 26 so the folded up crane can be handled as if it were on a dolly. It will be noted that there are no bolts used. Everything is attached to the assembly and some parts are spring loaded into position. There is virtually no risk of substitution of weak for strong parts, etc.

Additionally the crane embodying the invention can be easily disassembled without tools. This is of substantial advantage if the portable crane is to be transported. The crane can be easily disassembled so that it can be loaded into a vehicle and then easily reassembled without use of tools. In disassembly of the crane, the boom assembly 76 can be removed by lifting upwardly on the boom 76 so that the ram 84 can be pivoted rearwardly to a position against the mast. The boom 76 can then be pivoted downwardly to a generally vertical position and then lifted upwardly such that hook 87 is lifted away from pivot pin 82. The legs 18 can be removed from sockets 12 and 14 by lifting the keeper 32 out of the way by depressing tab 36. The mast assembly can be disassembled by pulling the U-shaped pin 60 upwardly and disconnecting the pins 58 at the upper end of the mast. The pins 56 at the lower ends of brackets 54 are then removed. The mast 52 can then be pulled upwardly out of the socket 50.

All the parts are rugged and simple and the entire device can be easily assembled. All parts are designed to be easily transported in a vehicle so the renter of the equipment can easily get the portable crane to the garage for use.

Various features of the invention are set forth in the following claims.

I claim:

1. A crane comprising:
- a base including a pair of spaced apart leg support members, each of the leg support members including a socket,
- a mast mounted on the base and extending upwardly from the base, the mast having an upper end,
- a boom pivotally connected to the upper end of the mast,
- a lifting ram having opposite ends, one end pivotally connected to the mast and the other end pivotally connected to the boom,
- a pair of crane legs each having opposite ends, one end of one of the crane legs being selectively housed in one of the sockets in telescoping relation and one end of the other crane leg being selectively housed in the other of the sockets in telescoping relation, and
- means for pivotally connecting one end of one of the legs to one of the leg support members, and means for pivotally connecting one end of the other of the legs to the other of the leg support members, the means for pivotally connecting providing for pivotal movement of the legs from a horizontal position to a generally vertical stored position adjacent the mast.

2. A crane as set forth in claim 1 and further including means for releasably connecting the legs to the mast.

3. A crane as set forth in claim 1 wherein the means for pivotally connecting includes means for selectively restraining the legs from removal from the sockets.

4. A crane as set forth in claim 3 wherein the means for selectively restraining includes latch members pivotally connected to each of the sockets, and hook members housed in ends of each of the legs, the latch members each being movable between a first position wherein the latch member engages the hook member to prevent removal of one of the legs from one of the sockets and a second position wherein the hook member does not engage the latch member and the one of the legs is removable from the one of the sockets.

5. A crane as set forth in claim 4 wherein the leg is supported for pivotal movement from a horizontal position to the generally vertical stored position by engagement of the hook member with the latch member.

6. A crane as set forth in claim 1 wherein each crane leg has a first telescoping portion and a second telescoping portion.

7. A crane as set forth in claim 6 further comprising means for releasably preventing telescoping movement of the first telescoping position with respect to the second telescoping portion, said means for releasably preventing telescoping movement including a first pin supported by said one of said telescoping portions for restricted movement between a first position wherein said first pin engages one of said telescoping portions to prevent removal of said other of said telescoping portions from said one of said telescoping portions and a second position wherein said first pin releases said other of said telescoping portions for removal from said one of said telescoping portions and said first pin being fixed to said one of said telescoping portions for restricted movement between said first position and said second position.

8. A crane comprising:
- a base including a pair of spaced apart leg support members, the leg support members each having forward ends and rearward ends, and a rigid member located between the leg support members, the rigid member having one end fixed to one of the leg support members and the other end fixed to the other leg support member,
- a mast mounted on the base and extending upwardly from the base, the mast having an upper end,
- a boom pivotally connecting to the upper end of the mast,
- a lifting ram having opposite ends, one end pivotally connected to the mast and the other end pivotally connected to the boom,
- a pair of crane legs each having opposite ends, one of the crane legs being supported by one of the leg support members and the other of the crane legs being supported by the other of the leg support members,
- a first pair of wheels supporting the forward ends of the spaced apart leg support members, and a second pair of wheels supporting the rearward ends of the leg support members, the second pair of wheels having one of the wheels spaced rearwardly of the rearward end of one of the leg support members and the other of the wheels spaced rearwardly of the rearward end of the other of the leg support members, and
- a bracket having opposite ends, one end of the bracket being fixed to a rearward end of one of leg support members and the other end of the bracket being fixed to a rearward end of the other of the leg support members, the second pair of wheels being positioned beneath the bracket and supporting the bracket.

9. A crane as set forth in claim 8 wherein each crane leg has a first telescoping portion and a second telescoping portion.

10. A crane as set forth in claim 9 further comprising means for releasably preventing telescoping movement of the first telescoping portion with respect to the second telescoping portion, said means for releasably preventing telescoping movement including a first pin supported by said one of said telescoping portions for restricted movement between a first position wherein said first pin engages one of said telescoping portions to prevent removal of said other of said telescoping portions from said one of said telescoping portions and a second position wherein said first pin releases said other of said telescoping portions for removal from said one of said telescoping portions for removal from said one of said telescoping portion and said fist pin being fixed to said one of said telescoping portions for restricted movement between said first position and said second position.

11. A crane comprising:
- a base including a pair of spaced apart generally elongated tubular sockets, each socket having an open forward end and a rearward end,
- a mast mounted on said base and extending upwardly from the base, the mast having an upper end,
- a boom pivotally connected to the upper end of the mast, the boom having an outer end adapted to support a load, a lifting ram having opposite ends, one end pivotally connected to the mast, and the other end pivotally connected to the telescopic boom, a pair of legs each having opposite ends, one end of one of the legs being removably housed in telescoping relation in one of the elongated tubular sockets, and one end of the other of the legs being removably housed in telescoping relation in the other of the elongated tubular sockets, and means providing a pivotal connection between the legs and the sockets to enable the legs to pivot from a horizontal position to a generally vertical position near the mast, the means for providing a pivotal connection including means for selectively disconnecting the legs from the sockets.

12. A crane as set forth in claim 11 wherein said means for providing a pivotal connection includes brackets fixed in each of said legs, each of said brackets including an upstanding end, and latches housed in each of said tubular sockets, each of said latches including one end engageable with an upstanding end of a respective one of the brackets, and each of said latches including an actuator on the other end, the actuator projecting from the socket for manual actuation to raise said latch to a non-interfering position.

13. A crane as set forth in claim 12 wherein said upstanding ends of the brackets each comprise a hook, the hook of each of the brackets being engageable with a respective one of the latches to provide for pivotal movement of the legs.

14. A crane as set forth in claim 12 wherein said actuator can be actuated to move said latch out of the path of said hook to enable removal of the leg from the socket.

15. A crane as set forth in claim 11 wherein each of said open forward ends of said sockets include a cut out portion adapted to house one of said legs when the legs are pivoted upwardly to the generally vertical position.

16. A crane as set forth in claim 11 wherein each crane leg has a first telescoping portion and a second telescoping portion.

17. A crane as set forth in claim 16 further comprising means for releasably preventing telescoping movement of the first telescoping position with respect to the second telescoping portion, said means for releasably preventing telescoping movement including a first pin supported by said one of said telescoping portions for restricted movement between a first position wherein said first pin engages one of said telescoping portions to prevent removal of said other of said telescoping portions from said one of said telescoping portions and a second position wherein said first pin releases said other of said telescoping portions for removal from said one of said telescoping portion and said first pin being fixed to said one of said telescoping portions for restricted movement between said first position and said second position.

18. A crane comprising:

a base including a pair of spaced-apart leg support members, each of the leg support members including a leg support socket, and a mast support member including a mast socket, a mast supported by the base and extending generally upwardly from the base, the mast having an upper end, and a lower end adapted to be housed in the mast socket, and the mast being removably supported by the mast socket, the mast further having therein a bore adapted to house a pair of pins having grooves and means for releasably engaging the pins when housed in the bore to selectively prevent removal of the pins from the bore, said means for releasably engaging the pins including a locking pin, the locking pin including a pair of ends adapted to be housed in the grooves, and a spring for biasing the ends of the locking pin into engagement with the grooves, a boom pivotally connected to the upper end of the mast, a lifting ram having opposite ends, one end pivotally connected to the mast, and the other end pivotally connected to the boom, a pair of crane legs each having opposite ends, one end of one of the crane legs being housed in one of the leg support sockets in telescoping relation, and one end of one of the other crane legs housed in the other of the leg support sockets in telescoping relation, and a pair of vertical braces, one of the vertical braces having a lower end connected by a pin to one of the leg support sockets and the other of the vertical braces having a lower end connected by a pin to the other of the leg support sockets, and means for releasably connecting the upper ends of the braces to the upper end of the mast, said means comprising a pair of pins housed in the bore in the mast, the first pin having therein a groove and being fixed to the upper end of one of the braces, and the second pin having therein a groove and being fixed to the upper end of the other of the braces.

* * * * *